F. J. SCRABLE.
WHETSTONE.
APPLICATION FILED APR. 22, 1911.
1,002,086.
Patented Aug. 29, 1911.
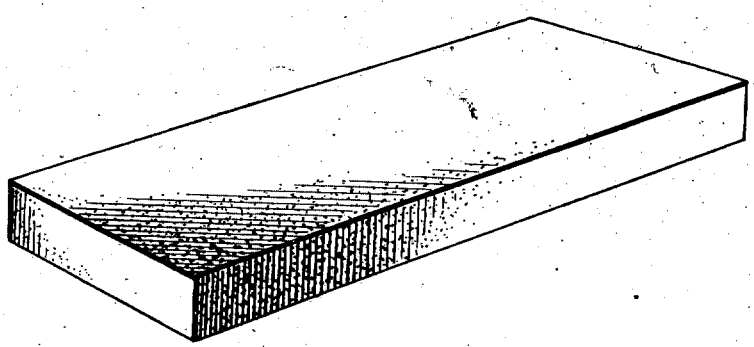
Witnesses
Chas. L. Giesbauer.
L. G. Ellis.
Inventor
F. J. Scrable,
By Watson E. Coleman
Attorney

UNITED STATES PATENT OFFICE.

FRANK J. SCRABLE, OF PITTSBURG, PENNSYLVANIA.

WHETSTONE.

1,002,086.  Specification of Letters Patent.  Patented Aug. 29, 1911.

Application filed April 22, 1911. Serial No. 622,697.

*To all whom it may concern:*

Be it known that I, FRANK J. SCRABLE, a citizen of the United States, residing at Pittsburg, in the county of Allegheny and State of Pennsylvania, have invented certain new and useful Improvements in Whetstones, of which the following is a specification, reference being had to the accompanying drawings.

My invention is an improved whetstone and composition of matter for making the same as hereinafter described and claimed.

The accompanying drawing illustrates one of my whetstones.

The whetstones, according to my invention, may be made of any suitable size and shape and I will have it understood that I am not limited as to this particular.

In the making of my improved whetstone I employ sand, four parts; earth, four parts; cement, four parts; red paint, one part and black paint, one part. These are thoroughly mixed, together with suitable quantities of water and oil and the mixture is subjected to heat and caused to boil for about one-half of an hour. The mixture having been thus boiled is then permitted to stand for about one hour to cool and is then thoroughly worked or mixed and pressed into a mold of the desired shape and size. When the stone has been thus molded it is then laid away for about one month. It is then soaked in water for about five hours and then laid away for about a week to dry. The stone is then polished and finished ready for use and to be placed on the market.

A whetstone made in accordance with my invention is of very fine quality and is especially adapted for whetting razors and other sharp edged cutting implements.

Having thus described my invention I claim:

1. The herein described composition of matter consisting of sand, earth, cement, paint, water and oil, thoroughly commingled and molded.

2. The herein described process for making whetstones consisting in mixing sand, earth, cement, paint, water and oil, boiling the said mixture, cooling the same, and molding, tempering and polishing the compound thus produced.

In testimony whereof I hereunto affix my signature in the presence of two witnesses.

FRANK J. SCRABLE.

Witnesses:
 W. P. LYONS,
 C. F. KALTREIDER.